(12) United States Patent
Haslanger (10) Patent No.: US 12,018,999 B2
(45) Date of Patent: Jun. 25, 2024

(54) TEST SYSTEM FOR A PRESSURE CONTROL EQUIPMENT SYSTEM

(71) Applicant: Schlumberger Technology Corporation, Sugar Land, TX (US)

(72) Inventor: Jonathan Haslanger, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 95 days.

(21) Appl. No.: 18/050,821

(22) Filed: Oct. 28, 2022

(65) Prior Publication Data

US 2023/0084644 A1 Mar. 16, 2023

Related U.S. Application Data

(63) Continuation of application No. 16/885,963, filed on May 28, 2020, now Pat. No. 11,486,788.

(51) Int. Cl.
*G01M 3/26* (2006.01)
*E21B 33/068* (2006.01)
*E21B 47/117* (2012.01)

(52) U.S. Cl.
CPC ............ *G01M 3/26* (2013.01); *E21B 33/068* (2013.01); *E21B 47/117* (2020.05); *E21B 2200/22* (2020.05)

(58) Field of Classification Search
CPC .... G01M 3/26; E21B 47/117; E21B 2200/22; E21B 33/068
See application file for complete search history.

(56) References Cited

U.S. PATENT DOCUMENTS

| 7,040,411 | B2 | 5/2006 | Kainer |
| 8,127,854 | B2 | 3/2012 | Haheim |
| 9,677,345 | B2 | 6/2017 | Miller, Jr. |
| 2008/0264649 | A1 | 10/2008 | Crawford |
| 2012/0150455 | A1 | 6/2012 | Franklin |

(Continued)

OTHER PUBLICATIONS

International Search Report and Written Opinion issued in International Patent Application No. PCT/US2021/033626 on Sept. 1, 2021; 12 pages.

(Continued)

*Primary Examiner* — Peter J Macchiarolo
*Assistant Examiner* — John M Royston
(74) *Attorney, Agent, or Firm* — Jeffrey D. Frantz (57) ABSTRACT

A test system for a pressure control equipment (PCE) stack includes a pump for directing fluid into the PCE stack, a drive for operating the pump to control fluid flow into the PCE stack, and a controller communicatively coupled to the drive and a sensor that transmits sensor data indicative of pressure within the PCE stack. The controller instructs the drive to cause the pump to direct fluid into the PCE stack until the sensor data indicates that the pressure within the PCE stack has reached a threshold pressure, blocks fluid flow into and out of the PCE stack upon receiving sensor data indicating the pressure within the PCE stack has reached the threshold pressure, monitors the pressure within the PCE stack over a time interval, and determines a condition of the PCE stack based on a change in the pressure within the PCE stack during the time interval.

20 Claims, 6 Drawing Sheets

(56) References Cited

U.S. PATENT DOCUMENTS

| | | |
|---|---|---|
| 2013/0213644 A1 | 8/2013 | Buyers |
| 2013/0311097 A1 | 11/2013 | Livesay et al. |
| 2014/0195286 A1 | 7/2014 | Dirksen |
| 2015/0354346 A1 | 12/2015 | Franklin et al. |
| 2016/0290889 A1 | 10/2016 | Hilpert et al. |
| 2018/0371886 A1 | 12/2018 | Zeghlache |
| 2019/0128114 A1 | 5/2019 | Bryant et al. |
| 2020/0048991 A1 | 2/2020 | Arteaga et al. |
| 2020/0123865 A1 | 4/2020 | Fundytus |
| 2020/0291733 A1 | 9/2020 | Van Kuilenburg |
| 2021/0189820 A1* | 6/2021 | Baklanov ................ E21B 23/14 |
| 2021/0317726 A1* | 10/2021 | Tawil ..................... G06F 30/13 |

OTHER PUBLICATIONS

International Preliminary Report on Patentability issued in the PCT Application PCT/US2021/033626 dated Dec. 3, 2022, 8 pages.
Substantive Exam issued in Saudi Arabia Patent Application No. 522441437 dated Nov. 23, 2023, 23 pages.

\* cited by examiner

TEST SYSTEM FOR A PRESSURE CONTROL EQUIPMENT SYSTEM

CROSS-REFERENCE TO RELATED APPLICATIONS

This application is a continuation of U.S. Non-Provisional application Ser. No. 16/885,963, filed on May 28, 2020.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Natural resources, such as oil and gas, are used as fuel to power vehicles, heat homes, and generate electricity, in addition to a myriad of other uses. Once a desired natural resource is discovered below the surface of the earth, mineral extraction systems are often employed to access and extract the resource. These mineral extraction systems may be located onshore or offshore depending on the location of the desired natural resource. Such mineral extraction systems generally include a wellhead assembly through which the desired natural resource is extracted via a well. The mineral extraction systems may also include pressure control equipment configured to carry out intervention operations to inspect or to service the well, for example. The pressure control equipment may be mounted above the wellhead assembly to protect other surface equipment from surges in pressure within the well or to carry out other supportive functions.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof. Numerical terms, such as "first," "second," and "third" are used to distinguish components to facilitate discussion, and it should be noted that the numerical terms may be used differently or assigned to different elements in the claims.

The present embodiments generally relate to a test system for a pressure control equipment (PCE) stack for a mineral extraction system (e.g., a drilling system, a production system). The PCE stack may be coupled to and/or positioned vertically above a wellhead during various intervention operations (e.g., inspection or service operations) of the mineral extraction system, such as wireline operations in which a tool supported on a wireline is lowered through the PCE stack to enable inspection and/or maintenance of a well. The test system described herein is configured to test an operating parameter of the PCE stack. For instance, the test system may automatically test a section of the PCE stack to determine whether there are any irregularities (e.g., holes, openings, slits, worn seal elements) in the structural geometry of the PCE stack that enable undesirable fluid flow out of the PCE stack. In some embodiments, the test system may direct a fluid into the section of the PCE stack and monitor a fluid pressure within the section over time to determine whether the structural geometry of the PCE stack is enabling undesirable fluid flow out of the PCE stack. For example, an unexpected decrease in the fluid pressure within the section over time may indicate that the structural geometry of the PCE stack is enabling undesirable fluid flow out of the PCE stack.

Figure 1:
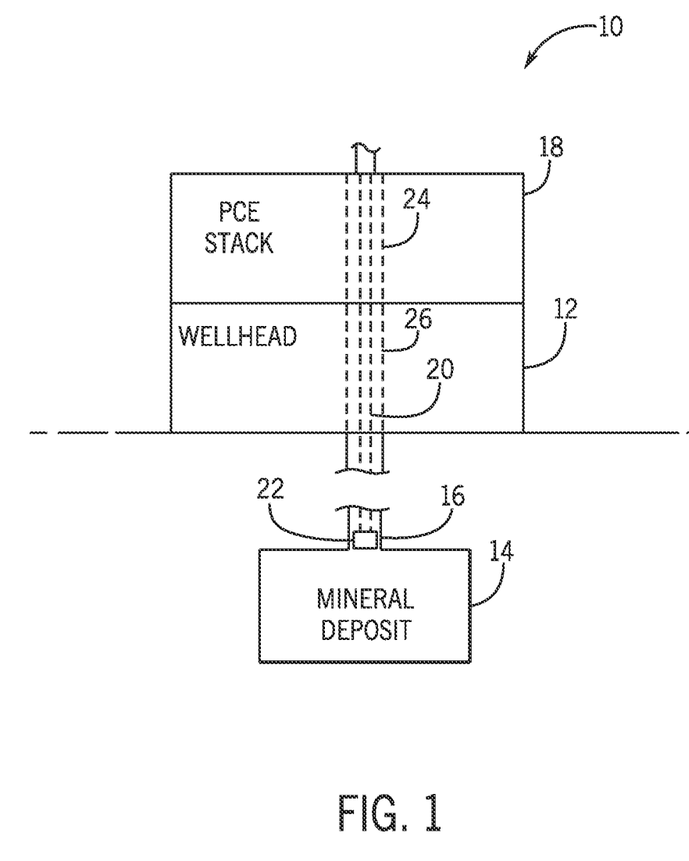
FIG. 1 is a schematic diagram of a system having a pressure control equipment (PCE) stack, in accordance with an embodiment of the present disclosure.

With the foregoing in mind, FIG. 1 is a schematic diagram of an embodiment of a system 10 (e.g., a mineral extraction system, a drilling system, a production system). The system 10 includes a wellhead 12 (e.g., a wellhead assembly), which is coupled to a mineral deposit 14 via a wellbore 16. The wellhead 12 may include any of a variety of components such as a spool, a hanger, and a "Christmas" tree. In the illustrated embodiment, a pressure control equipment (PCE)

stack 18 is coupled to the wellhead 12 to facilitate intervention operations, which may be carried out by lowering a conduit 20 (e.g., a communication conduit, a wireline, a slickline, a spoolable rod, or a coiled tubing) and/or a tool 22 (e.g., configured to collect data about the mineral deposit 14 and/or the wellbore 16) through a bore 24 defined by the PCE stack 18, through a bore 26 defined by the wellhead 12, and into the wellbore 16. As discussed in more detail below, the PCE stack 18 may include a valve that seals about the conduit 20 to isolate the environment, as well as other surface equipment, from pressurized fluid within the wellbore 16.

Figure 2:
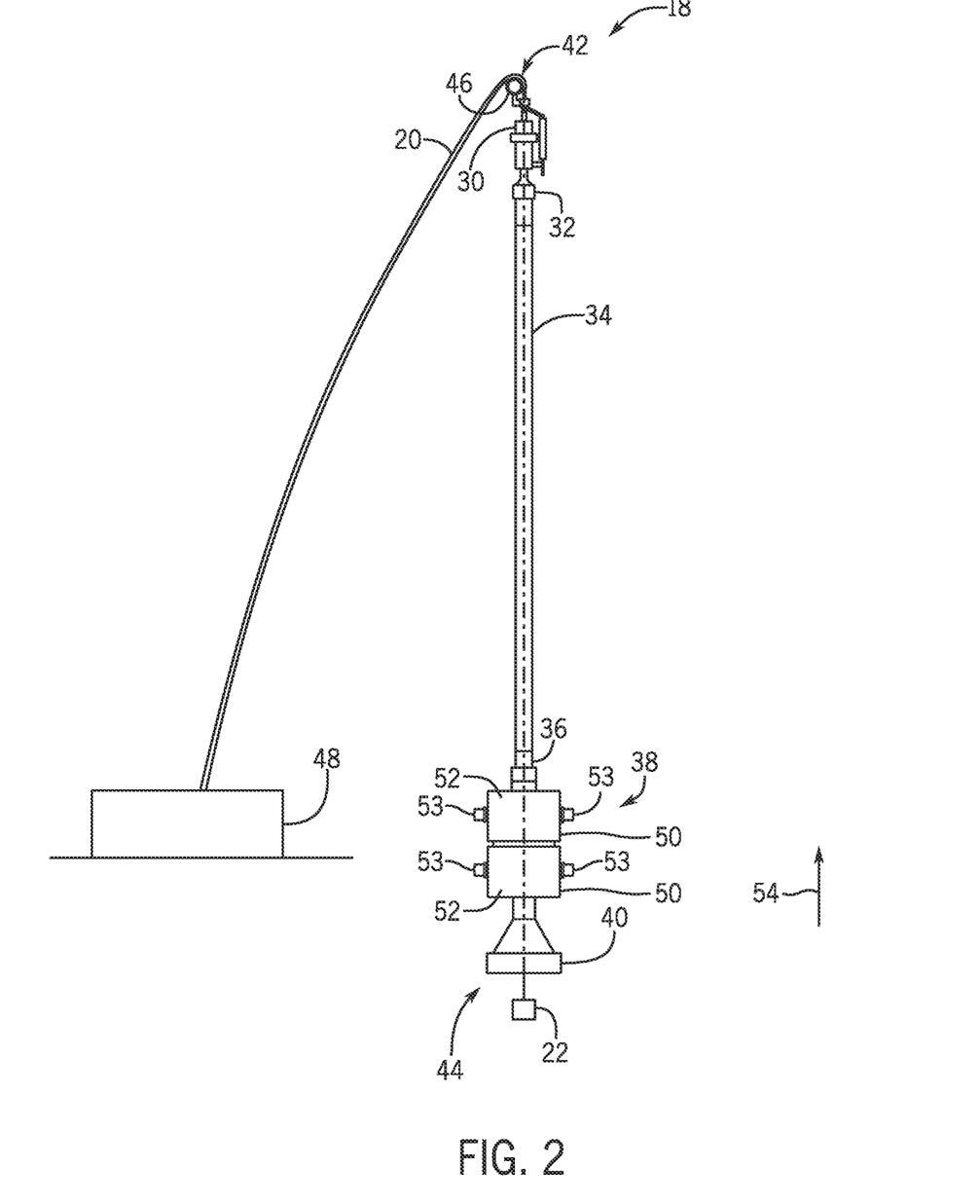
FIG. 2 is a side view of the PCE stack of FIG. 1, in accordance with an embodiment of the present disclosure.

FIG. 2 is a side view of an embodiment of the PCE stack 18 that may be used in the system 10 of FIG. 1. The PCE stack 18 may include one or more components that enable the PCE stack 18 to seal about the conduit 20. Thus, the PCE stack 18 may isolate the environment, as well as other surface equipment, from pressurized fluid within the wellbore 16 (FIG. 1).

In the illustrated embodiment, the PCE stack 18 includes a stuffing box 30, a tool catcher 32, a lubricator section 34, a tool trap 36, a valve stack 38, and a connector 40 to couple the PCE stack 18 to the wellhead 12 (FIG. 1) or other structure. These components are annular structures stacked vertically with respect to one another (e.g., coaxial) to enable the conduit 20 to extend through the PCE stack 18 (e.g., from a first end 42 to a second end 44 of the PCE stack 18) into the wellhead 12. As shown, the conduit 20 extends from the first end 42 of the PCE stack 18 and over a sheave 46 to a winch 48, and rotation of the winch 48 (e.g., of a drum or spool of the winch 48) raises and lowers the conduit 20 with the tool 22 through the PCE stack 18.

It should be noted that the PCE stack 18 may include various other components (e.g., a pump-in sub to enable fluid injection). Furthermore, it should be noted that the PCE stack 18 may include the valve stack 38 mounted to the wellhead via the connector 40, but the PCE stack 18 may not include one or more of the stuffing box 30, the tool catcher 32, the lubricator section 34, or the tool trap 36. For example, the PCE stack 18 may include the valve stack 38 alone or in combination with any of a variety of other components.

In the illustrated PCE stack 18, the stuffing box 30 is configured to seal against the conduit 20 (e.g., to seal an annular space about the conduit 20) to block a flow of fluid from the bore 24 (FIG. 1) vertically above the stuffing box 30. The tool catcher 32 is configured to engage or catch the tool 22 to block the tool 22 from being withdrawn vertically above the tool catcher 32 and/or to block the tool 22 from falling vertically into the wellbore 16. The lubricator section 34 may include one or more annular pipes joined to one another, and the lubricator section 34 may support or surround the tool 22 while the tool 22 is withdrawn from the wellbore 16. The tool trap 36 is configured to block the tool 22 from falling vertically into the wellbore 16 while the tool trap 36 is in a closed position.

As shown, the valve stack 38 may include one or more valves 50 that are configured to seal the bore 24. In the illustrated embodiment, the valve stack 38 includes two valves 50 that are vertically stacked relative to one another, and each valve 50 includes a housing 52. However, the valve stack 38 may include any suitable number of valves 50 (e.g., 1, 2, 3, 4, or more), and two or more valves 50 may share one housing 52. At least one of the one or more valves 50 may include rams may be driven between an open position in which the rams do not seal the bore 24 and a closed position in which the rams seal the bore 24 (e.g., seal about the conduit 20 to seal the bore 24), thereby blocking fluid flow through the bore 24.

The various components of the PCE stack 18 may be adjusted via actuators 53 (e.g., electric, hydraulic, pneumatic actuators). For example, in some embodiments, the one or more valves 50 may be adjusted between the open position and the closed position via actuators 53. To facilitate discussion, the valve stack 38 and its components may be described with reference to a vertical axis or direction 54. Further, it should be noted that the techniques described herein may be applied to any suitable embodiment of the PCE stack 18 or other PCE system or assembly, such as a different embodiment of the PCE stack 18 having a different set of components as described above. Further still, as used herein, the PCE stack 18 refers to a portion of the PCE stack 18 (e.g., a subassembly of the PCE stack 18) and/or an entirety of the PCE stack 18.

Figure 3:
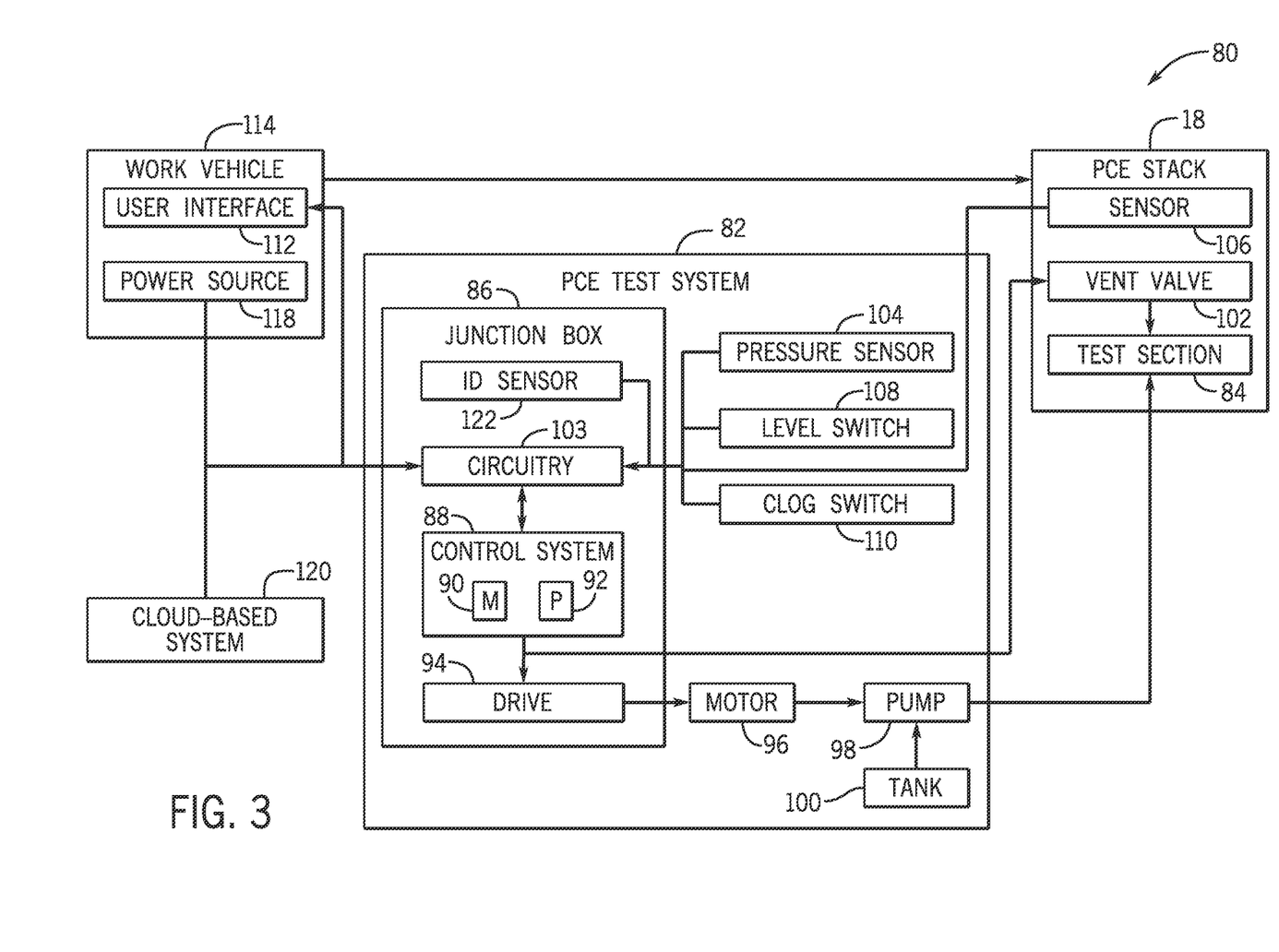
FIG. 3 is a schematic diagram of an embodiment of a PCE test system that may be used to test the PCE stack of FIGS. 1 and 2, in accordance with an embodiment of the present disclosure.

FIG. 3 is a schematic diagram of an embodiment of a system 80 for testing the PCE stack 18 (e.g., a part of the PCE stack 18 or an entirety of the PCE stack 18). The system 80 may include a PCE test system 82, which may be configured to test a structural geometry of a test section 84 of the PCE stack 18. By way of example, the test section 84 may include a portion of the PCE stack 18 between the stuffing box 30 and the valve stack 38 with reference to FIG. 2 or any other suitable part of the PCE stack 18 in which fluid may be directed and contained (e.g., isolated, held under pressure). In some embodiments, the PCE test system 82 may not be directly coupled to the wellbore to which the PCE stack 18 is coupled. For instance, the PCE test system 82 may include a skid, an enclosure, and the like, that is physically separate from the PCE stack 18 (e.g., more than 3 meters or 10 feet away), and conduits (e.g., flexible hoses) may fluidly couple the PCE test system 82 to the PCE stack 18. Indeed, the PCE test system 82 may include a variety of other components (e.g., handtools, transportation equipment) that may not be used for directly testing the PCE stack 18. In some embodiments, the PCE test system 82 may utilize a liquid, rather than compressed air or gas, to test the PCE stack 18. In additional or alternative embodiments, the PCE test system 82 may use compressed air or gas (e.g., nitrogen), to test the PCE stack 18.

In the illustrated embodiment, the PCE test system 82 includes a junction box or enclosure 86 that includes various components to enable testing of the PCE stack 18. The junction box 86 may include a control system 88 (e.g., a programmable logic controller) configured to operate the PCE test system 82 and to control the test of the PCE stack 18. The control system 88 may include a memory 90 and processing circuitry 92. The memory 90 may include volatile memory, such as random-access memory (RAM), and/or non-volatile memory, such as read-only memory (ROM), optical drives, hard disc drives, solid-state drives, or any other non-transitory computer-readable medium that includes instructions executable by the processing circuitry 92. The processing circuitry 92 may include one or more application specific integrated circuits (ASICs), one or more field programmable gate arrays (FPGAs), one or more general purpose processors, or any combination thereof, configured to execute the instructions stored in the memory 90, such as to control operations to test the PCE stack 18.

The control system 88 may be communicatively coupled to a drive 94 (e.g., a variable-frequency drive, a variable-speed drive), which is communicatively coupled to a motor 96 (e.g., an electric motor). The motor 96 is coupled to a pump 98 that may direct fluid from a tank 100 into the test section 84. In some embodiments, the fluid may include a liquid, such as water, glycol, oil, diesel, methanol or other alcohols, anti-freeze, another inert fluid, another suitable fluid, or any combination thereof. Accordingly, during a test mode or test operation of the PCE test system 82, the control system 88 may output control signals to the drive 94 in order to regulate a rate (e.g., a volumetric flow rate) in which the pump 98 directs the fluid from the tank 100 into the test section 84. Furthermore, the control system 88 may be communicatively coupled to a vent valve 102 (e.g., a solenoid valve) of the PCE stack 18 in order to enable fluid to be directed out of the PCE stack 18. For example, after the test mode is completed, the control system 88 may open the vent valve 102 to remove the fluid from the test section 84. With the fluid removed or substantially removed from the PCE stack 18, the PCE stack 18 may operate to perform intervention operations on the wellbore.

The control system 88 may be communicatively coupled to various sensors (e.g., via circuitry 103 that is coupled to and/or a part of the control system 88) and may receive sensor data from such sensors. As an example, the PCE test system 82 may include a pressure sensor 104 configured to monitor a pressure (e.g., a fluid pressure) within the PCE test system 82. For instance, the pressure sensor 104 may be configured to monitor a pressure within the conduit that connects the pump 98 to the test section 84. Such pressure may be indicative of a pressure within the test section 84. During the test mode of the PCE test system 82, the circuitry 103 may receive a pressure reading from the pressure sensor 104 and may forward the pressure reading to the control system 88 and enable the control system 88 to control the drive 94 based on the pressure reading. By way of example, the control system 88 may be configured to instruct the drive 94 to cause the pump 98 to direct fluid into the test section 84 until the pressure monitored by the pressure sensor 104 reaches a first threshold pressure.

After the pressure has reached the first threshold pressure, the control system 88 may instruct the drive 94 to suspend or terminate directing the fluid into the test section 84 and/or to fluidly isolate the pump 98 from the test section 84 (e.g., from the test section 84 and the conduit that connects the pump 98 to the test section 84 via closure of a valve). The control system 88 may then monitor the pressure determined by the pressure sensor 104 over time to determine a pressure change within the test section 84. In particular, the pressure change may be indicative of a structure of the PCE stack 18 maintaining fluid within the test section 84. As an example, if the change of pressure over a period of time is above a threshold change of pressure, the control system 88 may determine that the structure of the PCE stack 18 is not desirable (e.g., the structure causes an undesirable amount of fluid to exit the test section 84) and may, for instance, output a notification to indicate that the PCE stack 18 is to undergo inspection and/or maintenance (e.g., to replace seal elements).

After the period of time of the test mode has passed, indicating the PCE test system 82 has completed testing of the test section 84, the control system 88 may then instruct the vent valve 102 to open to direct the fluid out of the test section 84, thereby reducing the pressure within the test section 84. For instance, the control system 88 may instruct the vent valve 102 to open until the pressure within the test section 84 is below a second threshold pressure. When the pressure has dropped below the second threshold pressure, the control system 88 may instruct the vent valve 102 to close, and the PCE stack 18 may be in condition to perform intervention operations.

The control system 88 may additionally or alternatively receive sensor data from one or more sensor(s) 106 of the PCE stack 18. In certain embodiments, the sensor(s) 106 may be configured to directly monitor pressure within the test section 84, and the control system 88 may instruct the drive 94 to direct fluid into the test section 84 based on the pressure readings made by the sensor(s) 106 in addition to or as an alternative to the pressure readings made by the pressure sensor 104. Indeed, the control system 88 may receive multiple pressure readings and compare such pressure readings to verify an accurate pressure reading within the test section 84 and ensure accurate testing. For example, the control system 88 may determine a final pressure reading within the test section 84 based on an average (e.g., a mathematical mean) of the received pressure readings and/or may verify that the pressure readings are within a threshold pressure difference of one another in order to determine that each pressure reading accurately reflects the pressure within the test section 84.

In further embodiments, the rate at which fluid is delivered into the test section 84 may be based on the readings made by the pressure sensor 104 and/or the sensor(s) 106. For example, as the pressure within the test section 84 increases toward the first threshold pressure (e.g., within 5, 10, 15, 20, 25, 30, 40, or 50 percent of the first threshold pressure), the control system 88 may instruct the drive 94 to reduce the flow rate at which fluid is directed from the tank 100 into the test section 84 in order to avoid exceeding the first threshold pressure. The control system 88 may instruct the drive 94 to reduce the flow rate at which fluid is directed from the tank 100 into the test section 84 in a continuous or step-wise manner (e.g., within 25 percent of the first threshold pressure, the flow rate is reduced to 75 percent of an initial flow rate, and within 10 percent of the first threshold pressure, the flow rate is reduced to 50 percent of the initial flow rate, and so forth) for at least a portion of the process of providing fluid into the test section 84. That is, for instance, when the pressure reading is within a threshold range of the first threshold pressure, the control system 88 may reduce the rate at which the pump 98 directs fluid into the test section 84 and may therefore gradually increase the pressure within the test section 84 to the first threshold pressure.

Further still, although the present disclosure primarily discusses operation based on a pressure within the test section 84, the control system 88 may operate based on sensor data that includes another operating parameter, such as a total volume of fluid within the test section 84, a level of fluid within the tank 100, and/or any other suitable operating parameter. Indeed, the control system 88 may operate any suitable component based on received sensor data. For instance, the sensor(s) 106 may also include a position sensor, such as a position sensor configured to monitor a position of the vent valve 102. In this way, the control system 88 may control the vent valve 102 (e.g., an opening size of the vent valve 102) based on the position indicated by the sensor data and/or other operating parameters received from the other sensors 104, 106, such as to remove fluid from the PCE stack 18 at a target flow rate and/or to provide fluid to the PCE stack 18 in response to the vent valve 102 being closed as indicated via the sensor data.

In the illustrated embodiment, the control system 88 may also receive a respective signal from a level switch 108 and/or a respective signal from a clog switch 110 in order to initiate operations. As an example, the level switch 108 may indicate an amount of fluid available (e.g., within the tank 100) for delivery into the test section 84, and the clog switch 110 may be configured to determine whether there is a clog in the pump 98 and/or in a fluid conduit to block the pump 98 from directing fluid at a sufficient rate into the test section 84. That is, before the control system 88 instructs the drive 94 to enable the pump 98 to direct fluid from the tank 100 into the test section 84, the control system 88 may verify that there is a sufficient amount of fluid available (e.g., the amount of fluid in the tank 100 is above a threshold fluid level or volume that would enable the test section 84 to be filled and the test mode to be completed) and that there is sufficient clearance for the pump 98 to supply fluid at a desirable or target flow rate into the test section 84. As such, the data received from the level switch 108 and/or the clog switch 110 (e.g., as forwarded by the circuitry 103) may enable the control system 88 to operate the pump 98 in a desirable manner. The control system 88 may also continue to verify sensors, such as the fluid level 108 or clog switch 110 continuously or at intervals during the pumping of fluid to ensure the system and pump 98 continues to operate in a desirable manner. In further embodiments, the operation of the drive 94 may be automatically suspended or terminated to reduce or limit a stress imparted onto the drive 94 when operating at a higher power level or setting to enable the pump 98 to direct fluid into the test section 84. As an example, the drive 94 may not operate when a torque output, a horsepower output, and/or a current input exceeds a threshold value, such as when there is a blockage within the conduit through which fluid flows to the test section 84. The pump 98 may not operate (e.g., may stall) at excessive pressure. Thus, the PCE test system 82 provides for several layers of control (e.g., shut-off control). Although the illustrated embodiment includes the circuitry 103 communicatively coupled to the sensors 104, 106 and switches 108, 110, additional or alternative embodiments may not include the circuitry 103. Instead, the sensors 104, 106 and switches 108, 110 may be directly communicatively coupled to the control system 88 (e.g., via a communication network, such as a wireless network).

A portion of the operation of the control system 88 may be controlled remotely based on a user input (e.g., from an operator, from a technician). For example, the user input may adjust an operating parameter (e.g., the first threshold pressure, the second threshold pressure, the fluid flow rate) of the test mode of the control system 88, initiate the test mode of the control system 88, suspend the test mode of the control system 88, and so forth. In some embodiments, the user input may be received from a user interface 112, which may be in a work vehicle 114 (e.g., a wireline truck). The user interface 112 may, for instance, include a touchscreen, a track pad, a button, a switch, a dial, an audio sensor (e.g., for voice activation), a motion sensor (e.g., for gestural input), another suitable feature, or any combination thereof, to enable a user to control operation of the control system 88. The user interface 112 may be communicatively coupled to the circuitry 103. Thus, the circuitry 103 may receive the user input via the user interface 112 and may forward the user input to the control system 88 to cause the control system 88 to operate accordingly. As a result, a user within the work vehicle 114 may remotely control operation of the control system 88 (e.g., while remote from or physically separated from the PCE stack 18 and the PCE test system 82).

Furthermore, the control system 88 may output a control signal to the user interface 112, such as to present a display via the user interface 112. By way of example, during the test mode of the PCE test system 82, the control system 88 may output a control signal to the user interface 112 to display test data to the user, thereby enabling the user to observe data (e.g., pressure data, such as the pressure data from the pressure sensor 104 and/or the sensor(s) 106) monitored during the test to monitor the performance of the test of the testing section 84 and/or ensure the PCE test system 82 is operating as desired. In another example, the control system 88 may output a control signal that causes the user interface 112 to display a notification, such as a notification indicative that the PCE test system 82 and/or the PCE stack 18 is to be inspected (e.g., in response to the pressure data decreasing in a manner that indicates that the structure of the PCE stack 18 is not desirable). The control system 88 may output a control signal that causes the user interface 112 to display data and/or a notification related to operation of the PCE test system 82 (e.g., data from the level switch 108, data from the clog switch 110, a notification that the pump 98 is not operating in a desirable manner). In any case, the user may utilize the user interface 112 in order to monitor various data associated with the PCE test system 82 and/or the PCE stack 18.

In the illustrated embodiment, the work vehicle 114 also includes a power source 118 configured to supply power, such as electrical power, to the control system 88. For this reason, the power source 118 may be electrically coupled to the circuitry 103 and may supply electrical power to the circuitry 103 to enable the control system 88 to operate. In additional or alternative embodiments, the power source 118 may not be located within the work vehicle 114 and may, for instance, be disposed within an enclosure at the PCE test system 82, separate from the PCE test system 82, and/or separate from the work vehicle 114. Moreover, the circuitry 103 may include various components (e.g., a circuit breaker, a fuse) configured to block the power supplied by the power source 118, such as when the power is an unexpected and/or an undesirable voltage, and maintain an operation of the control system 88. The circuitry 103 may also include components, such as a converter, configured to adjust the supplied power to a usable level (e.g., from a first current to a second current) to enable operation of the PCE test system 82.

Additionally or alternatively, the user input may be received via a cloud-based system 120, such as a cloud-computing system, which is communicatively coupled to the circuitry 103. By way of example, the cloud-based system 120 may enable the user to control operation of the control system 88 from a remote computing device (e.g., a mobile phone, a laptop, a desktop, a tablet), such as via an application interface. As a result, the cloud-based system 120 may enable the user to control the operation of the control system 88 at any suitable location (e.g., remote from or physically separate from the PCE test system 82, including from the work vehicle 114 without a wired connection and/or from another location). In further embodiments, the user interface 112 and/or the cloud-based system 120 may be directly coupled to the control system 88 and not to the circuitry 103, thereby enabling the control system 88 to receive the user input directly. In any case, the user may set a desired operation of the control system 88, and the control system 88 may automatically operate the drive 94 to direct fluid within the test section 84 accordingly.

Further, in some embodiments, the control system 88 may be configured to operate in a variety of different preset or predetermined operations, such as based on the particular PCE stack 18 to which the PCE test system 82 is coupled. For example, the operation of control system 88 may be adjustable to accommodate specifications of the PCE stack 18 (e.g., the type of equipment or components of the PCE stack 18), thereby improving the testing of the PCE stack 18. For this reason, the user input received via the user interface 112 and/or the cloud-based system 120 may indicate the PCE stack 18 to which the PCE test system 82 is coupled. For instance, the user input may include an identification (e.g., a code) of the embodiment of the PCE stack 18, and the control system 88 may receive the user input and automatically operate the test mode in accordance with the user input (e.g., select a test mode protocol from multiple available test mode protocols stored in the memory 90 and/or determine/develop a test mode protocol using one or more algorithms, in which the test mode protocol is appropriate for the PCE stack 18). The control system 88 may additionally or alternatively receive identification data (e.g., image data, code data) that is indicative of characteristics of specifications of the PCE stack 18, and thus, is indicative of a desirable operation of the PCE test system 82. To this end, the PCE test system 82 may include an identification sensor 122 (e.g., an image sensor or a radio-frequency identification reader) or other suitable type of sensor that is configured to obtain identification data, such as a quick response code, a bar code, and/or a code from a radio-frequency identification tag, in order to set the operation of the control system 88 (e.g., to select or determine/develop the test mode protocol). By way of example, the identification sensor 122 may read one or more codes stored in one or more radio-frequency identification tags, which may be coupled to one or more components of the PCE stack 18, and the control system 88 may receive the one or more codes, verify the specification of the PCE stack 18, and automatically operate accordingly, such as by automatically setting the first threshold pressure, the second threshold pressure, the fluid flow rate, or any other operating parameter of the test mode. It should be noted the control system 88 may additionally or alternatively receive specifications of one or more components (e.g., the pump 98) of the PCE test system 82 in a similar manner, and may operate accordingly.

Although the present disclosure primarily discusses operation of the PCE test system 82 to test the PCE stack 18, the PCE test system 82 may operate for other purposes. For example, when hydrates that impact operation of the PCE stack 18 are formed, the control system 88 may operate to cause the pump 98 to direct a different fluid, such as glycol and/or methanol, into the PCE stack 18 to mitigate the effects of the hydrates. Indeed, the pump 98 may be operated to direct any suitable fluid into the PCE stack 18, such as at any suitable fluid flow rate, to any amount, and so forth, based on the fluid type, the specification of the PCE stack 18, the specification of the PCE test system 82, another suitable factor, or any combination thereof, under control of the control system 88 (e.g., automatically controlled by the control system 88 in response to data from one or more sensors of the PCE stack 18 and/or user inputs via the user interface 112 or other remotely located user interface). For example, the control system 88 may monitor characteristics, such as a fluid composition (e.g., presence of hydrates), within the PCE stack 18 by using an additional sensor, determine a flow rate of fluid to be directed into the PCE stack 18 based on the sensor data, instruct the drive 94 to cause the pump 98 to direct the fluid into the PCE stack 18 at the determined flow rate of fluid, dynamically determine an updated flow rate of the fluid based on the sensor data during testing, and instruct the drive 94 to adjust the pump 98 based on the updated flow rate (e.g., automatically without real-time user input). In such cases, the control system 88 may be configured to output (e.g., based on the user interface 112) a fluid volume of the different fluid injected into the PCE stack 18.

Figure 4:
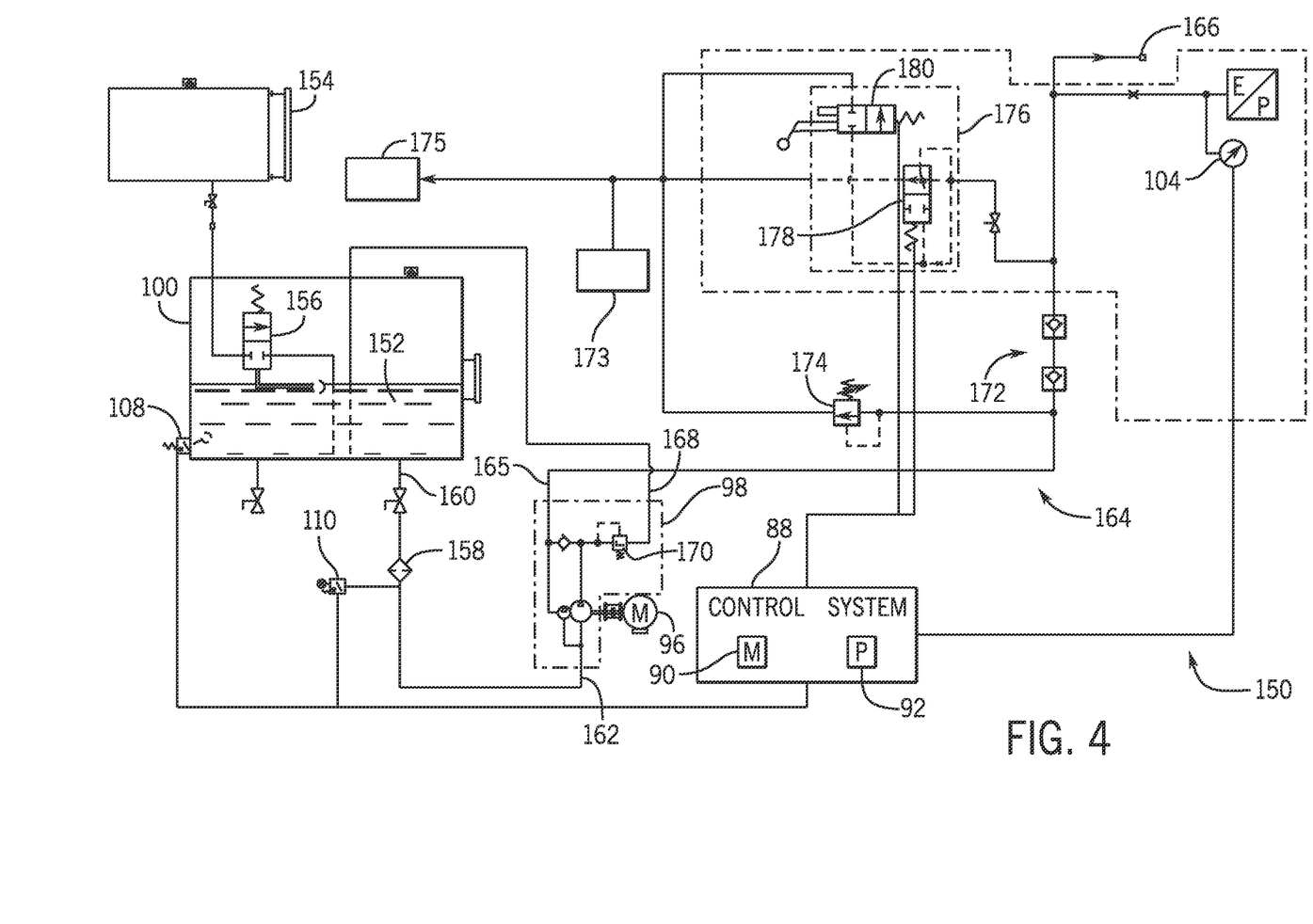
FIG. 4 is a schematic diagram of an embodiment of a hydraulic system that may be used by the PCE test system of the system of FIG. 3 to test the PCE stack of FIGS. 1 and 2, in accordance with an embodiment of the present disclosure.

FIG. 4 is a schematic diagram of an embodiment of a hydraulic system 150 that may be used by the PCE test system 82 to direct fluid into the test section 84 of the PCE stack 18 with reference to FIG. 3. The hydraulic system 150 includes the tank 100, which may contain fluid 152 to be directed to the PCE stack 18. The tank 100 may be fluidly coupled to a reservoir 154, which may hold the fluid 152. For example, the reservoir 154 may be fluidly coupled to other systems (e.g., other hydraulic systems) to supply the fluid 152 and enable the operation of the other systems. The tank 100 may include a valve 156 (e.g., a float valve) that may be configured to transition between an open configuration and a closed configuration. In the open configuration, the valve 156 may enable the fluid 152 to flow from the reservoir 154 to fill the tank 100. In the closed configuration, the valve 156 may block the fluid 152 from flowing into the tank 100 from the reservoir 154. The configuration of the valve 156 may be based on the level of the fluid 152 within the tank 100. For instance, the valve 156 may include a buoyant component, and a position of the buoyant component may set the configuration of the valve 156. The level of the fluid 152 may drive the positioning of the buoyant component, thereby setting the configuration of the valve 156. In particular, when the level of the fluid 152 in the tank 100 is low, the buoyant component may be positioned (e.g., by a gravitational force) to open the valve 156 and enable fluid flow into the tank 100, thereby increasing the fluid level. However, when the level of the fluid 152 in the tank 100 reaches a first threshold level, the buoyant component may be positioned to close the valve 156 to block fluid flow into the tank 100, thereby blocking the fluid level from increasing (e.g., to avoid overflowing the tank 100). As used herein, the fluid 152 and/or the fluid flow refers to a portion of the fluid 152 at any suitable location within the hydraulic system 150.

The tank 100 may also be fluidly coupled to the pump 98 to enable the pump 98 to direct the fluid 152 out of the tank 100. In the illustrated embodiment, a filter 158 (e.g., a strainer) is implemented between an outlet 160 (e.g., an outlet valve) of the tank 100 and an inlet 162 of the pump 98. The filter 158 may block certain particles, such as dirt and/or debris, from flowing into the pump 98. Thus, the filter 158 may ensure that the pump 98 primarily receives the fluid 152 from the tank 100 in order to maintain an operation of the pump 98. The hydraulic system 150 may include the level switch 108 and/or the clog switch 110 communicatively coupled to the control system 88 that is configured to control operation of the motor 96 and therefore of the pump 98. Indeed, the level switch 108 may monitor the level of the fluid 152 within the tank 100 and may transmit data to the control system 88 to indicate that the level of the fluid 152 within the tank 100 is below a second threshold level that is below the first threshold level, such as when there is an insufficient amount of fluid available in the reservoir 154 for supply to the tank 100. Accordingly, the control system 88 may suspend operation of the motor 96 and the pump 98 to avoid further reducing the fluid level within the tank 100 and/or to avoid running the motor 96 and the pump 98 in the absence of the fluid at the pump 98. Further, the clog switch 110 may monitor a performance of the filter 158. For example, the clog switch 110 may monitor a clearance of the filter 158 and may transmit data to the control system 88 to indicate when there is a blockage of the filter 158. Upon receipt of such data from the clog switch 110, the control system 88 may suspend operation of the motor 96 to avoid placing an undesirable stress on the motor 96 and the pump 98 and/or to direct the fluid 152 at a desirable rate to the PCE stack. In some embodiments, the clog switch 110 or another switch may detect particulate matter within the fluid 152 downstream of the filter 158 (e.g., between the filter 158 and the pump 98), and the control system 88 may suspend operation of the motor 96 based on the detection of particulate matter to protect operation of the motor 96 and/or the pump 98.

A fluid conduit or tubing 164 fluidly couples a first outlet 165 of the pump 98 to a fluid connection 166 (e.g., a fluid port) that is configured to fluidly couple to the test section of the PCE stack (e.g., along the lubricator section 34 and between the stuffing box 30 and the valve stack 38, with reference to FIG. 2). Thus, the pump 98 may direct the fluid 152 from the tank 100 into the PCE stack. Further, the pressure sensor 104 is fluidly coupled to the fluid conduit 164 upstream of the fluid connection 166. As such, the pressure sensor 104 is configured to determine a pressure within the fluid conduit 164, and the pressure may be indicative of a fluid pressure within the PCE stack, such as within the test section. Indeed, the control system 88 may control operation of the motor 96 and of the pump 98 based on sensor data received from the pressure sensor 104. In some embodiments, the pump 98 may also be fluidly coupled to the tank 100 at a second outlet 168 and may include a valve 170 configured to enable the pump 98 to direct the fluid 152 back into the tank 100 instead of toward the fluid connection 166. For instance, the valve 170 may be a pressure valve configured to open when the pressure within the pump 98 (e.g., caused by the pressure within the fluid conduit 164) exceeds a threshold pressure (e.g., 15 bar, 17 bar, 20 bar). Thus, the valve 170 blocks a further increase within the fluid conduit 164.

The illustrated hydraulic system 150 also includes check valves 172 configured to block fluid flow back into the pump 98 via the first outlet 165, and a pressure relief valve 174 disposed between the check valves 172 and the first outlet 165 of the pump 98. The pressure relief valve 174 is configured to block fluid flow from the pump 98 to the fluid connection 166 and into the PCE stack. For example, the pressure relief valve 174 may open to direct the fluid 152 from the fluid conduit 164 to a drainage reservoir 173 and/or a waste reservoir 175 when the pressure within the fluid conduit 164 exceeds a threshold pressure (e.g., 500 bar, 750 bar, 1000 bar). As such, the pressure relief valve 174 may therefore cause the fluid 152 to flow from the first outlet 165 of the pump 98 to the drainage reservoir 173 and/or the waste reservoir 175 instead of toward the fluid connection 166.

The hydraulic system 150 may further include a decompression valve assembly 176, which may be fluidly coupled to the fluid conduit 164 between the pressure sensor 104 and the check valves 172. The decompression valve assembly 176 may enable the fluid 152 to flow out of the PCE stack, such as via the fluid connection 166, and into the drainage reservoir 173 and/or the waste reservoir 175. Although the illustrated decompression valve assembly 176 is a part of the hydraulic system 150 of the PCE test system, an additional or alternative decompression valve assembly 176 may be disposed within the PCE stack (e.g., as the vent valve 102 described with respect to FIG. 3) to enable the fluid 152 to flow out of the PCE stack without having to flow through the fluid connection 166. In any case, the decompression valve assembly 176 may include a first valve 178, which may be communicatively coupled to the control system 88. The control system 88 may automatically control the first valve 178 by outputting a control signal to the first valve 178 to enable or block fluid flow through the decompression valve assembly 176 to remove the fluid 152 from the PCE stack. As an example, the control system 88 may be configured to output the control signal after receiving an indication that the test mode of the PCE test system has been completed in order to prepare the PCE stack to operate one of the intervening operations. Indeed, the control system 88 may automatically operate the first valve 178 based on the sensor data received from the pressure sensor 104, such as to maintain the first valve 178 in an open configuration to direct the fluid 152 out of the PCE stack until the sensor data indicates the pressure within the PCE stack is below a threshold pressure. Additionally or alternatively, the sensor data received from the sensor(s) 106 in FIG. 2 may be used by the control system 88 to control the decompression valve assembly 176 in this manner.

The decompression valve assembly 176 may further include a second valve 180, which may also be communicatively coupled to the control system 88. The control system 88 may operate the second valve 180 in response to receiving a user input, such as from the user interface 112 of the work vehicle 114 and/or from the cloud-based system 120 with respect to FIG. 3. Additionally or alternatively, the user may physically or manually adjust the second valve 180 (e.g., without operating the control system 88). In any case, the user input may override the current operation (e.g., the test mode) of the PCE test system so as to remove fluid from the PCE stack. In other words, the user may physically or manually operate the second valve 180 to direct the fluid 152 out of the PCE stack regardless of the configuration of the first valve 178.

Figure 5:
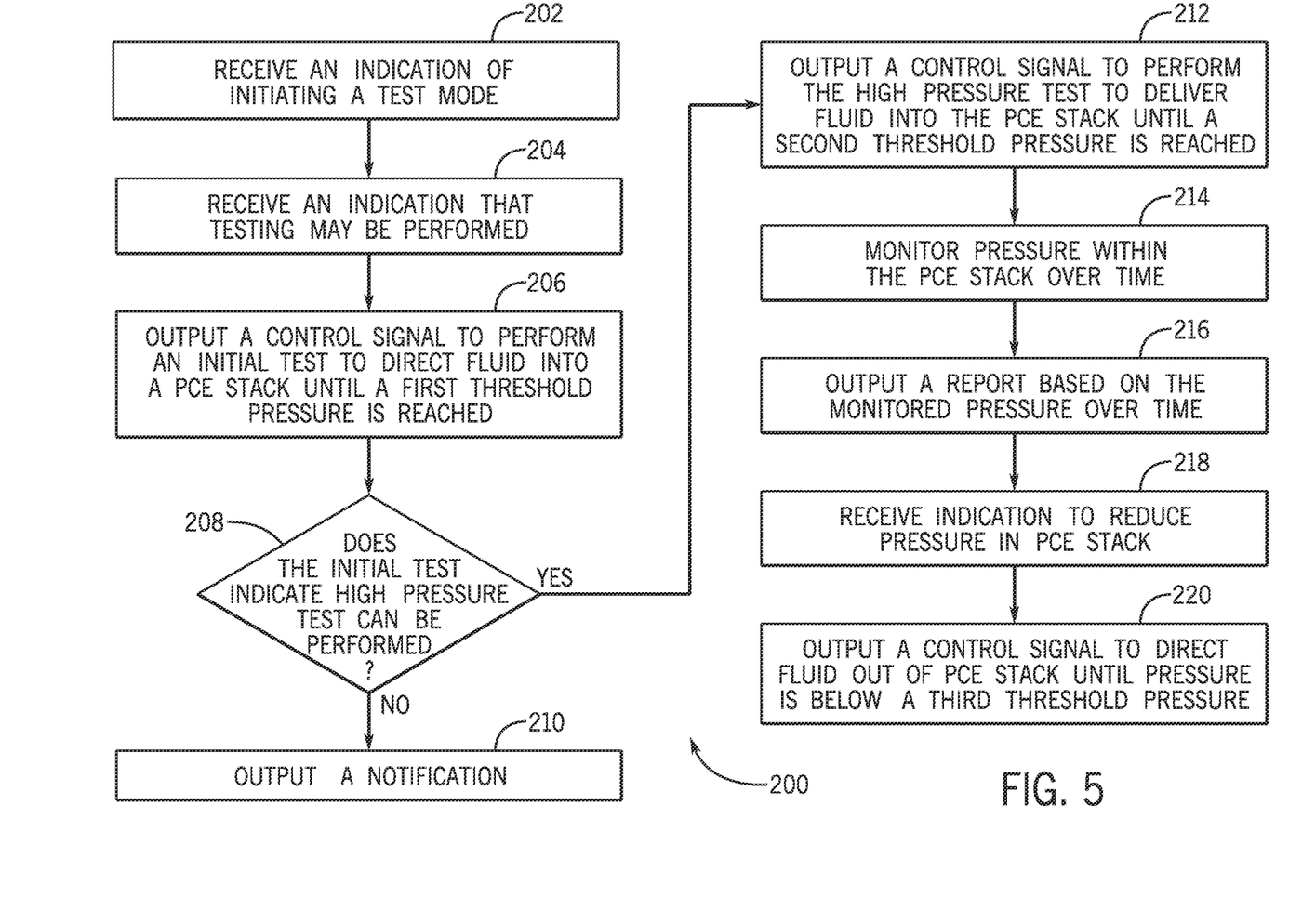
FIG. 5 is a flowchart of an embodiment of a method or process for operating the PCE test systems of FIGS. 3 and 4 to test the PCE stack of FIGS. 1 and 2, in accordance with an embodiment of the present disclosure.
Figure 6:
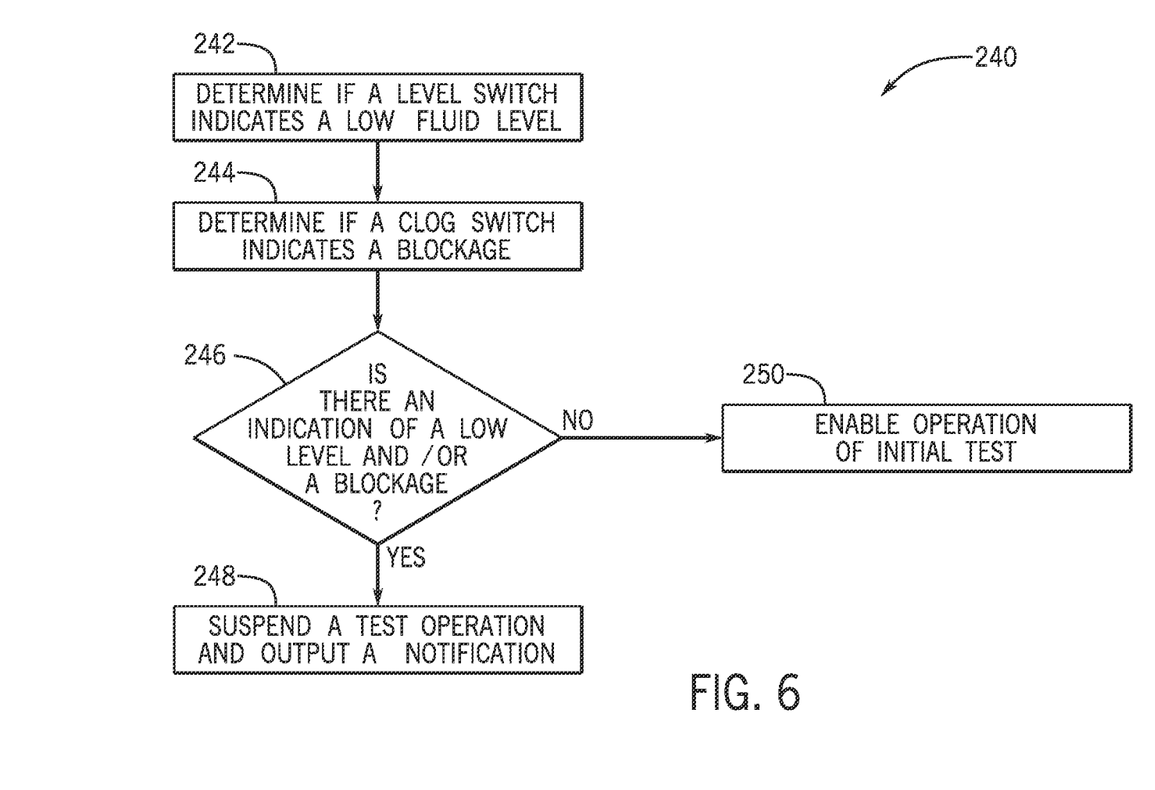
FIG. 6 is a flowchart of an embodiment of a method or process for enabling the PCE test systems of FIGS. 3 and 4 to conduct an initial test of the PCE stack of FIGS. 1 and 2, in accordance with an embodiment of the present disclosure.

Each of FIGS. 5 and 6 illustrates a respective method or process for operating a PCE test system, such as the PCE test system 82 described with respect to FIG. 3. Each method may be performed by a control system, such as the control system 88 described with respect to FIG. 3. It should be noted that each method may be performed in a different manner than described herein. For example, additional steps may be performed, and/or certain steps may be removed, modified, and/or performed in a different order. Furthermore, in some embodiments, the user may provide inputs (e.g., confirmations) between steps in order to proceed to further steps. For example, the user may be provided with a report (e.g., a digital or electronic report, a physical printout), and after review of the report, the user may provide an input to instruct the control system to proceed to further steps.

FIG. 5 is a flowchart of an embodiment of a method or process 200 for operating the test mode to determine the structure of the PCE stack (e.g., whether the structure of the PCE stack can appropriately contain pressurized fluid). At block 202, an indication of initiating a test mode of the PCE test system is received. In some embodiments, the indication may be received via a user input, such as from the user interface of the work vehicle and/or from the cloud-based system. In additional or alternative embodiments, the indication may be timing data. By way of example, the test mode may be performed at a preset or predetermined frequency (e.g., once per day, once per week, once per year, once prior to operation of the PCE stack), and the timing data may indicate that it is the appropriate time for the test mode to be performed at the preset or predetermined frequency.

At block 204, an indication that testing may be performed is received. In certain embodiments, the indication may include sensor data indicative that the PCE test system and/or the PCE stack are in condition for testing. For instance, the sensor data may indicate that there is sufficient fluid within the tank (e.g., as indicated by the level switch) and/or that the pump is cleared to direct fluid from the tank into the PCE stack (e.g., as indicated by the clog switch). Moreover, the sensor data may indicate that various components, such as sealing elements (e.g., of the stuffing box, the valve stack), conduits (e.g., of the hydraulic system), sensors, and so forth, of the PCE test system and/or the PCE stack are in a position or a configuration to fill the test section of the PCE stack and enable testing. Indeed, the PCE test system and/or the PCE stack may be pre-tested by using an auxiliary pump to direct fluid through the PCE test system and/or the PCE stack (e.g., into a part of the test section of the PCE stack) to ensure the PCE test system and/or the PCE stack are in condition for testing. Additionally or alternatively, the indication may include a user input that confirms or verifies the PCE test system and/or the PCE stack are in condition for testing. That is, for example, the user may be prompted to inspect and/or pre-test various sections of the PCE test system and/or of the PCE stack to verify that the PCE test system and/or the PCE stack are in condition for testing. The user may then transmit the user input (e.g., via the user interface, the cloud-based system) to indicate the PCE test system and/or the PCE stack are in condition for testing.

At block 206, in response to verification that the PCE test system and/or the PCE stack are in condition for testing, an initial test may be performed by instructing the pump to direct fluid from the tank into the test section of the PCE stack until a first or initial threshold pressure (e.g., 20.6 bar or 300 pounds per square inch [psi], 27.6 bar or 400 pounds psi, 34.5 bar or 500 psi) within the test section is reached. For example, the pump may direct fluid into the test section based on a target fluid flow rate and/or a target pressure rate of increase in the test section. After the first threshold pressure has been reached, fluid flow into test section may be blocked (e.g., by suspending operation of the pump, by fluidly isolating the test section from the pump). Prior to and/or during the initial test, air or other current fluid within the PCE stack may be removed (e.g., via the vent valve, the decompression valve, a bleed valve) to enable the pump to direct fluid and fill the PCE stack. As the test section of the PCE stack fills with fluid, the pressure within the PCE stack may be monitored by the user and/or by a sensor in order to determine whether further testing on the test section of the PCE stack may be performed.

At block 208, a determination is made regarding whether the initial test indicates a high pressure test of the test section of the PCE stack may be performed. By way of example, during the initial test, the pressure within the PCE stack may be monitored to determine whether the pressure within the test section is increasing and/or is maintained at a desirable level, such as whether a configuration of a certain component, a position of a certain component, and/or a structural geometry of the PCE test system and/or the PCE stack are blocking fluid flow into the test section, causing the fluid to flow out of the test section, or otherwise blocking the pressure within the test section from reaching and maintaining (e.g., substantially maintaining) the first threshold pressure. In some embodiments, the pressure may be automatically monitored via the pressure sensor of the PCE test system and/or the sensor(s) of the PCE stack to enable automatic determination of whether the high pressure test may be performed. In additional or alternative embodiments, the user may be prompted to observe the pressure and/or the operation of the PCE test system and/or the PCE stack during the initial test, and the user may transmit a user input indicative of whether the high pressure test may be performed.

If there is an indication that the high pressure test cannot be performed, a notification may be output, as indicated at block 210. By way of example, the notification may be output for display to the user (e.g., as a visual output, as an audio output) to inform the user that the high pressure test may not be performed. As such, the user may inspect the PCE test system and/or the PCE stack to determine why the PCE test system may not perform the high pressure test. Indeed, if there is an indication that the high pressure test cannot be performed, the high pressure test may not be initiated until an additional input is received to indicate that the PCE test system and/or the PCE stack has been inspected, and that the PCE stack is now in condition for high pressure testing or to repeat the initial test. Further, in some implementations, the notification may be stored, such as in a database. Thus, the notification may be retrieved at a later time, such as during maintenance of the PCE test system and/or of the PCE stack to determine whether there have been any previous occurrences in which the high pressure test was blocked from initialization.

Additionally or alternatively, the fluid may be removed from the PCE stack when there is an indication that the high pressure test cannot be performed. For example, a valve (e.g., the vent valve, the decompression valve) may be opened to enable the fluid to flow out of the PCE stack and reduce the pressure within the PCE stack. As such, the PCE stack may be returned to a condition that was present prior to initiation of the initial test.

If there is an indication that the high pressure test can be performed, a control signal may be output to continue to deliver fluid into the PCE stack until a second or high threshold pressure (e.g., 69 bar or 1000 psi, 55.1 bar or 800 psi, 103 bar or 1500 psi) within the test section is reached, as shown at block 212. As an example, the indication may be received via a user input to initiate the high pressure test or via sensor data from the pressure sensor of the PCE test system and/or sensor(s) of the PCE stack. During the high pressure test, the pump may be operated to direct fluid from the tank into the test section. In certain embodiments, the pump may initially direct the fluid at a preset flow rate into the test section, and the pump may gradually reduce the flow rate in which fluid is directed into the test section as the pressure within the test section increases in order to avoid causing the pressure within the test section to exceed the second threshold pressure. That is, as the pressure within the test section approaches the second threshold pressure (e.g., as measured by the pressure sensor), the pump may direct the fluid at a reduced rate and gradually increase the pressure to reach the second threshold pressure. In some embodiments, the second threshold pressure may be set by the user via a user input. In additional or alternative embodiments, the second threshold pressure may be set automatically, such as based on a determined specification or configuration of the PCE stack.

After the second threshold pressure is reached and the high pressure test has been completed, operation of the pump (e.g., of the drive and/or the motor of the pump) may be suspended and/or the test section may be isolated from the pump to block additional fluid from being directed from the pump into the test section. At block 214, after operation of the pump has been suspended, the pressure within the test section may be monitored over a predetermined or preset interval of time (e.g., 10 minutes, 15 minutes, 30 minutes, 1 hour), which may be based on a user input and/or automatically determined based on a specification of the PCE stack. In this way, the pressure within the test section over the interval of time may be monitored to determine a pressure drop rate, or a pressure drop over the interval of time. Such pressure drop may be indicative of a structural geometry (e.g., an irregularity within the structure) of the PCE stack that causes the fluid to flow undesirably out of the test section.

At block 216, a report (e.g., a digital or electronic report, a physical printout) is output based on the monitored pressure within the test section over the interval of time. The report may indicate a value of the pressure over time, such as via a table, a graph, a chart, and the like. The report may additionally indicate an overall performance of the test, such as to indicate whether the PCE stack is in condition to operate (e.g., to operate one of the intervening operations). For example, if the total pressure drop is below 20.7 bar or 300 psi, 34.5 bar or 500 psi, 55.1 bar or 800 psi, or another suitable threshold pressure drop, the report may indicate that the PCE stack is in condition to operate. However, if the total pressure drop over the interval of time is above the threshold pressure drop, the report may indicate that the PCE stack is not in condition to operate. Additionally or alternatively, if the rate of pressure drop (e.g., the pressure drop over any block of time within the interval of time) is above a threshold rate, a determination may be made that the PCE stack is not in condition to operate, and the report may be output accordingly. By way of example, if the rate of pressure drop at any point within the interval of time exceeds the rate of pressure drop at any time, a determination may be made that the PCE stack is not in condition to operate, even though the total pressure drop over the interval of time may be below the threshold pressure drop. In this way, the report may be provided before completion of the test mode (e.g., if the rate of pressure drop exceeds the rate of pressure drop before completion of the test mode, then a report indicating that the PCE stack is not in condition to operate may be provided before the remaining time of the test mode are completed), and/or the test mode may be terminated before completion of the test mode. The report may also indicate other operating parameters or conditions, such as a speed setting for the motor, an actual speed for the motor, a fluid flow rate, and/or a fluid volume injected into the PCE stack, in order to facilitate the user with analyzing the operation of the PCE test system and/or the PCE stack.

In some embodiments, the report may be output for display to the user (e.g., to the user interface, to a computing device). Thus, the user may review the report and inspect the PCE stack accordingly. In additional or alternative embodiments, the report may be stored in a database and may be retrieved at a later time. Indeed, a respective report may be stored after completion of each high pressure test, such as to enable the user to review historical information regarding the PCE stack. By way of example, the user may review the reports to determine whether the condition of the PCE stack has been changing over time, such as the differences in the respective pressure drops associated with different completed high pressure tests. In addition to or as an alternative to the report, another notification may be output based on the monitored pressure to indicate whether the PCE stack is in condition to operate. For instance, the notification may include a visual display (e.g., a light) and/or an audio display (e.g., a sound) indicative of the condition of the PCE stack.

In certain embodiments, machine learning may be used to associate the result of the high pressure test with the determined condition of the PCE stack. As used herein, machine learning refers to algorithms and statistical models that may be used to perform a specific task without using explicit instructions, relying instead on patterns and inference. In particular, machine learning generates a mathematical model based on data (e.g., sample or training data, historical data) in order to make predictions or decisions without being explicitly programmed to perform the task. Thus, as high pressure tests are performed, the patterns of the pressure drop (e.g., the threshold pressure drop, the threshold pressure drop rate, expected patterns of pressure drop for a properly sealed test section and/or for an improperly sealed test section) may be updated and better reflect whether the PCE stack is in condition to operate. Thus, the patterns may be referred to (e.g., a current pattern of pressure drop for a current test mode may be compared to one or more patterns generated via machine learning) for accurately determining the condition of the PCE stack and generating the report.

In some embodiments, such as during availability of particular known examples that correlate to future predictions that may be generated, supervised machine learning may be implemented. In supervised machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally and/or alternatively, in some situations, it may be beneficial to utilize unsupervised learning (e.g., when particular output types are not known). Unsupervised learning algorithms take a set of data that contains only inputs and find structure in the data, such as grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data. In any case, machine learning may be used to identify the condition of the PCE stack accordingly.

At block 218, an indication is received to reduce the pressure in the test section of the PCE stack. As an example, the indication may be received via sensor data. For instance, the sensor data may indicate that the high pressure test has been completed, and the fluid is to be directed out of the test section accordingly. As another example, the indication may be received via a user input in which the user indicates that the fluid is to be directed out of the test section. Further, it should also be noted that the indication to reduce the pressure in the test section PCE stack may be received at any time, such as regardless of the result of the high pressure test and/or at any time during the test mode (e.g., according to a time schedule so as to conduct the test mode over a period of time). Indeed, the indication may be received during the high pressure test (e.g., based on sensor data indicating fluid is flowing undesirably out of the test section), during the initial test, after the initial test, and so forth, to return the PCE stack to a condition prior to initializing testing of the PCE stack.

After the indication to reduce the pressure in the test section is received, a control signal is output to direct fluid out of the PCE stack until the pressure within the test section is below a third threshold pressure, as indicated at block 220. The control signal may cause a valve (e.g., the vent valve, the decompression valve) to open and enable fluid to flow out of the PCE stack. As the fluid flows out of the PCE stack, sensor data indicative of the pressure within the test section may be monitored and used to determine when the valve may be closed again (e.g., when the fluid has been directed out of or substantially out of the test section). For instance, the valve may be open until the sensor data indicates that the pressure is below 0.7 bar or 10 psi, 1.4 bar or 20 psi, 2.1 bar or 30 psi, or another suitable threshold pressure. After the pressure is indicated to be below the third threshold pressure, the valve may be closed, thereby blocking fluid flow out of the PCE stack via the valve and preparing the PCE stack for operation (e.g., in one of the intervening operations).

FIG. 6 is a flowchart of an embodiment of a method or process 240 for enabling the PCE test system to operate the initial test of the PCE stack. For example, the method 240 may be performed as a part of the block 204 (e.g., after the block 202 in which the indication of initiating the test mode or operation is received) of the method 200 with reference to FIG. 5 in order to determine whether the PCE test system and/or the PCE stack is in condition for testing. At block 242, a determination may be made regarding whether a level switch indicates that a fluid level within the tank is low. For example, a determination may be made regarding whether the level switch indicates the fluid level in the tank is below a threshold level, which may block the pump from directing fluid from the tank into the PCE stack at a target flow rate, such as by blocking the pump from receiving fluid from the tank. At block 244, a determination may be made regarding whether a clog switch indicates there is a blockage that may also block the pump from directing fluid from the tank into the PCE stack at the target flow rate, such as by blocking fluid from flowing through the pump. For instance, a determination may be made regarding whether a collection of particles trapped by a filter occupies a threshold surface area on the filter exceeding a threshold surface area to block fluid flow through the filter (e.g., into the pump). Accordingly, at block 246, a determination is made regarding whether there is at least one of either an indication of a low fluid level and/or a blockage that would block the pump from directing fluid from the tank into the PCE stack at the target flow rate.

At block 248, the test mode of the PCE test system is suspended and a notification is output in response to a determination that there is at least one of either the indication of a low fluid level and/or a blockage that would block the pump from directing fluid from the tank into the PCE stack at the target flow rate. That is, the test mode is suspended and the notification is output based on a determination of a low fluid level via the level switch, a blockage via the clog switch, or both. Suspension of the test mode may block the initial test and/or the high pressure test from being initiated. Further, the notification may inform the user that the test mode is suspended. Thus, the user may inspect the PCE test system and/or the PCE stack to address the indications and enable the pump to direct the tank into the PCE stack at the target flow rate. As an example, the user may adjust the fluid connection between the reservoir and the tank to increase the fluid level in the tank and/or to inspect the fluid connection between the tank and the pump to remove the blockage of the pump. In this manner, the user may place the PCE test system and/or the PCE stack in condition to continue operation of the test mode.

If a determination is made that there is not at least one of either the indication of a low fluid level or a blockage, the operation of the initial test may be enabled, as indicated at block 250. In some embodiments, a notification may be output to notify the user that the initial test may be initiated without automatically starting the initial test. As such, the initial test may not be initiated until the user transmits a user input to initiate the test. In additional or alternative embodiments, the initial test may be automatically started without the user input. In this way, after a determination is made that there is not at least one of either the indication of a low fluid level or a blockage, the operation of the initial test may be initiated without outputting the notification. In any case, if there is no indication of a low fluid level or a blockage, operation of the pump (e.g., of the drive, of the motor) may be enabled to direct the fluid from the tank into the test section of the PCE stack. It should be noted that blocks 242, 244, and 246 may be carried out periodically, continuously, or in response to a request input by the user via the user interface during the test mode. For example, the output of the level switch and/or the clog switch may be analyzed during the test mode (e.g., during the high pressure test), and then the test mode may either be suspended and/or continued accordingly.

While the disclosure may be susceptible to various modifications and alternative forms, specific embodiments have been shown by way of example in the drawings and have been described in detail herein. However, it should be noted that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A test system comprising:
   a pump configured to direct fluid into a pressure control equipment (PCE) stack;
   a drive configured to operate a motor of the pump to control a flow of the fluid directed into the PCE stack; and
   a control system communicatively coupled to the drive and a sensor configured to transmit sensor data indicative of fluid composition within the PCE stack, wherein the control system is configured to perform operations comprising:

monitoring the sensor data;
determining a flow rate of the fluid to be directed into the PCE stack based on the sensor data;
instructing the drive to cause the pump to direct the fluid into the PCE stack at the determined flow rate of the fluid;
dynamically determining an updated flow rate of the fluid based on continued monitoring of the sensor data; and
instructing the drive to adjust the pump based on the updated flow rate.

2. The test system of claim 1, wherein the control system is configured to perform operations further comprising: outputting a fluid volume of the fluid directed into the PCE stack.

3. The test system of claim 1, wherein the fluid is at least one of glycol and methanol.

4. The test system of claim 1, wherein the fluid is able to mitigate effects of hydrates impacting operation of the PCE stack.

5. The test system of claim 1, wherein the PCE stack is configured to couple to a wellhead that is disposed about a wellbore.

6. The test system of claim 1, wherein the control system is configured to perform operations further comprising: outputting a report upon determining a condition of the PCE stack, the report comprising at least one of: the condition of the PCE stack, the sensor data indicative of the fluid composition within the PCE stack, the flow rate of the fluid, and the updated flow rate of the fluid.

7. The test system of claim 2, wherein the control system is configured to perform operations further comprising: outputting a report upon determining a condition of the PCE stack, the report comprising at least one of: the condition of the PCE stack, the sensor data indicative of the fluid composition within the PCE stack, the flow rate of the fluid, the updated flow rate of the fluid, and the fluid volume directed into the PCE stack.

8. The test system of claim 1, further comprising an identification sensor communicatively coupled to the control system, wherein the identification sensor is configured to transmit identification data to the control system, the identification data is indicative of characteristics of the PCE stack, and the control system is configured to perform at least one operation based on the identification data.

9. A test system for a pressure control equipment (PCE) stack, the test system comprising:
a pump configured to direct fluid into the PCE stack, wherein the PCE stack is configured to couple to a wellhead that is disposed above a wellbore;
a drive configured to operate a motor of the pump to control a flow of the fluid directed into the PCE stack; and
a control system communicatively coupled to the drive and a sensor configured to transmit sensor data indicative of a pressure within the PCE stack, wherein the control system is configured to perform operations comprising:
instructing the drive to cause the pump to direct the fluid into the PCE stack until the sensor data indicates that the pressure within the PCE stack has reached a threshold pressure;
outputting a control signal to block the fluid from flowing between the pump and the PCE stack in response to receiving the sensor data that indicates that the pressure within the PCE stack has reached the threshold pressure;
monitoring the pressure within the PCE stack over an interval of time based on the sensor data;
determining patterns of pressure drop based on a change in the pressure within the PCE stack during the interval of time;
comparing the determined patterns of pressure drop to one or more patterns generated via machine learning; and
determining a condition of the PCE stack based on the comparison.

10. The test system of claim 9, wherein the control system is configured to perform operations comprising outputting a report upon determining the condition of the PCE stack, and the report comprises the condition of the PCE stack, the sensor data indicative of the pressure within the PCE stack over the interval of time, or both.

11. The test system of claim 9, wherein the control system is configured to perform operations comprising:
receiving an indication to reduce the pressure within the PCE stack; and
instructing a valve to open and enable the fluid to be directed out of the PCE stack until the sensor data indicates that the pressure within the PCE stack is below an additional threshold pressure.

12. The test system of claim 11, wherein the indication is received via a user input, additional sensor data, or both.

13. The test system of claim 9, wherein the threshold pressure, the interval of time, a flow rate of the fluid directed by the pump into the PCE stack, or any combination thereof, are based on a user input, a predetermined setting, the sensor data, or any combination thereof.

14. The test system of claim 9, comprising an identification sensor communicatively coupled to the control system, wherein the identification sensor is configured to transmit identification data to the control system, the identification data is indicative of characteristics of the PCE stack, and the control system is configured to perform operations comprising setting the threshold pressure, the interval of time, a flow rate of the fluid directed by the pump into the PCE stack, or any combination thereof, based on the identification data.

15. The test system of claim 9, wherein the PCE stack is configured to couple to a wellhead that is disposed about a wellbore.

16. A non-transitory computer readable medium comprising executable instructions that, when executed by processing circuitry, are configured to cause the processing circuitry to perform operations comprising:
receiving sensor data indicative of a pressure within a pressure control equipment (PCE) stack;
instructing a drive to cause a pump to direct fluid into the PCE stack until the sensor data indicates that the pressure within the PCE stack has reached a threshold pressure;
suspending operation of the drive in response to receiving the sensor data that indicates that the pressure within the PCE stack has reached the threshold pressure;
monitoring the pressure within the PCE stack over an interval of time based on the sensor data;
determining patterns of pressure drop based on a change in the pressure within the PCE stack during the interval of time;
comparing the determined patterns of pressure drop to one or more patterns generated via machine learning; and
determining whether the PCE stack is in condition for operation based on the comparison.

17. The non-transitory computer readable medium of claim 16, wherein the instructions, when executed by the processing circuitry, are configured to cause the processing circuitry to perform operations comprising outputting a notification, a report, or both, based on determining whether the PCE stack is in condition for operation.

18. The non-transitory computer readable medium of claim 16, wherein the instructions, when executed by the processing circuitry, are configured to cause the processing circuitry to perform operations comprising instructing the drive to operate based on a target flow rate of fluid into the PCE stack, a specification of the PCE stack, the sensor data, or any combination thereof.

19. The non-transitory computer readable medium of claim 16, wherein the PCE stack is configured to couple to a wellhead that is disposed about a wellbore.

20. The non-transitory computer readable medium of claim 16, wherein the instructions, when executed by the processing circuitry, are configured to cause the processing circuitry to perform operations comprising:
    determining whether a level switch indicates a low fluid level within a tank from which the pump receives the fluid;
    determining whether a clog switch indicates a blockage within a hydraulic system through which the pump directs the fluid; and
    suspending operation of the drive in response to determining the level switch indicates the low fluid level, determining the clog switch indicates the blockage, or both.

* * * * *